United States Patent
Toro

(10) Patent No.: US 7,794,895 B2
(45) Date of Patent: Sep. 14, 2010

(54) BIPOLAR SEPARATOR FOR FUEL CELL STACK

(75) Inventor: Antonino Toro, Segrate (IT)

(73) Assignee: Nuvera Fuel Cells Europe S.r.l., Milan (IT)

( * ) Notice: Subject to any disclaimer, the term of this patent is extended or adjusted under 35 U.S.C. 154(b) by 999 days.

(21) Appl. No.: 10/572,534

(22) PCT Filed: Sep. 30, 2004

(86) PCT No.: PCT/EP2004/010930

§ 371 (c)(1),
(2), (4) Date: Mar. 17, 2006

(87) PCT Pub. No.: WO2005/031900

PCT Pub. Date: Apr. 7, 2005

(65) Prior Publication Data

US 2006/0263667 A1    Nov. 23, 2006

(30) Foreign Application Priority Data

Oct. 1, 2003 (IT) .......................... MI2003A1881

(51) Int. Cl.
*H01M 8/02* (2006.01)

(52) U.S. Cl. .................................. 429/518; 429/512
(58) Field of Classification Search .................. 429/39
See application file for complete search history.

(56) References Cited

U.S. PATENT DOCUMENTS

| 3,589,942 A | 6/1971 | Leitz, Jr. et al. |
| 4,279,731 A | 7/1981 | Pellegri |
| 5,578,388 A | 11/1996 | Faita et al. |

FOREIGN PATENT DOCUMENTS

| WO | WO 00/70698 | 11/2000 |
| WO | WO 02/23645 | * 3/2002 |
| WO | WO 02/078112 | * 10/2002 |

* cited by examiner

*Primary Examiner*—Patrick Ryan
*Assistant Examiner*—Ashley Kwon
(74) *Attorney, Agent, or Firm*—Finnegan, Henderson, Farabow Garrett & Dunner, LLP

(57) ABSTRACT

It is described a bipolar separator for polymer membrane fuel cell stacks, delimited by two sheets provided with fluid passage holes connected by means of a corrugated element and comprising a passage section for a thermostatting liquid, which allows to achieve the withdrawal of heat from the adjacent cells and the humidification and distribution of gases with a single integrated piece, simplifying the assembly and the hydraulic sealing of the stack.

13 Claims, 3 Drawing Sheets

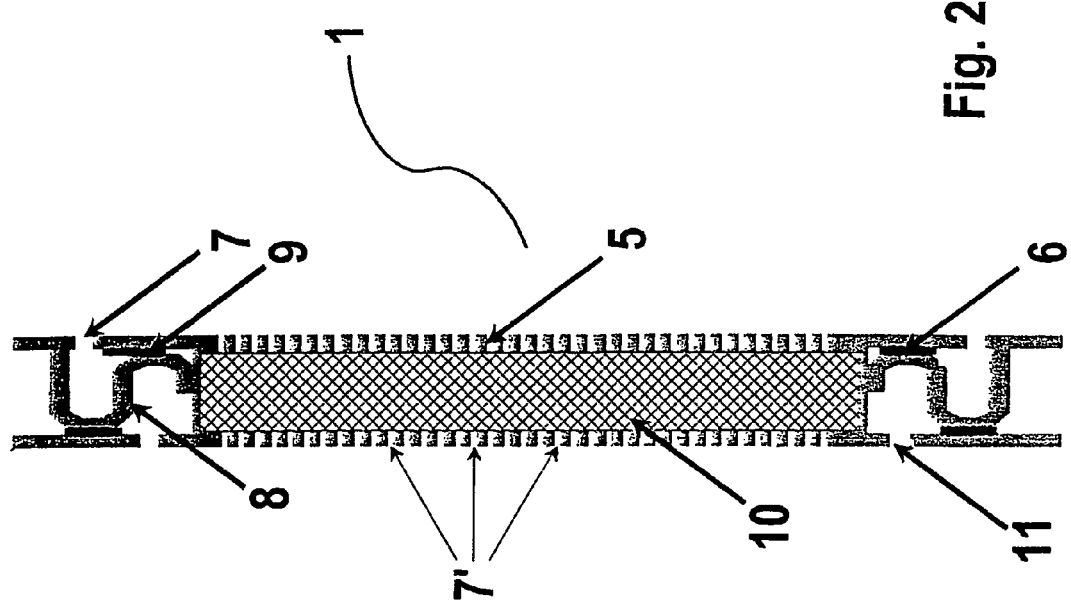
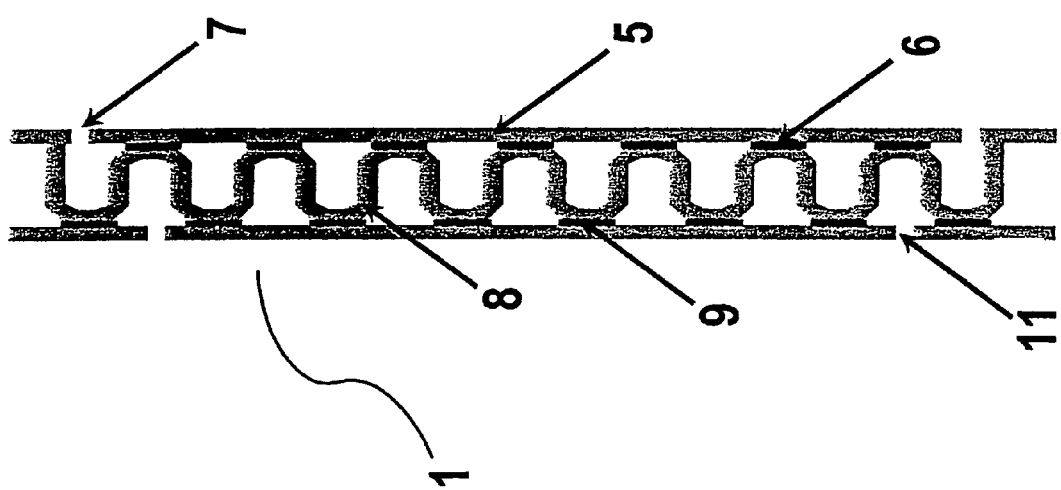
Fig. 2

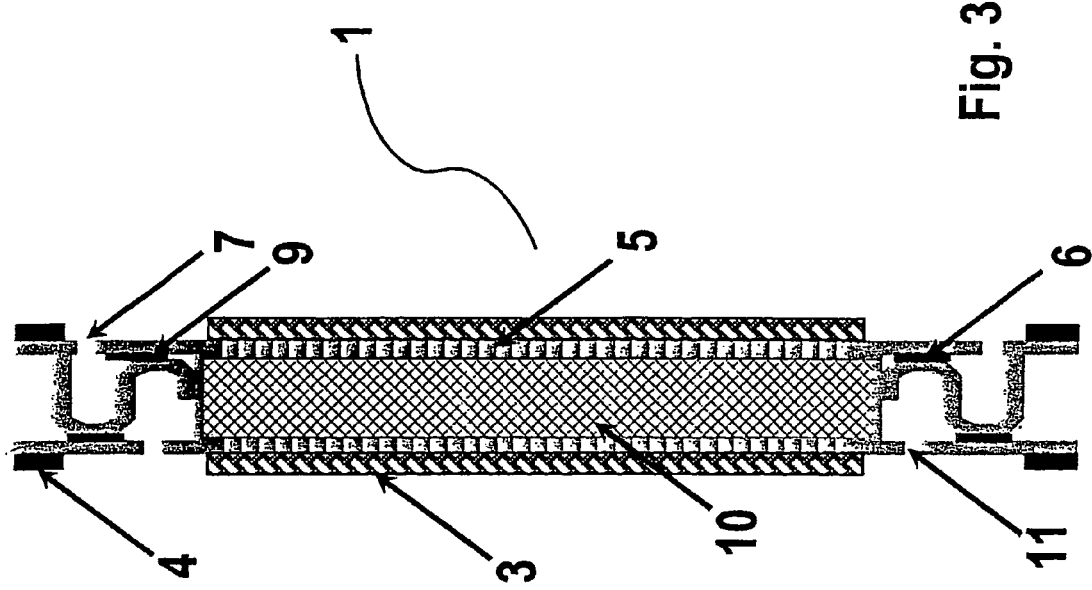
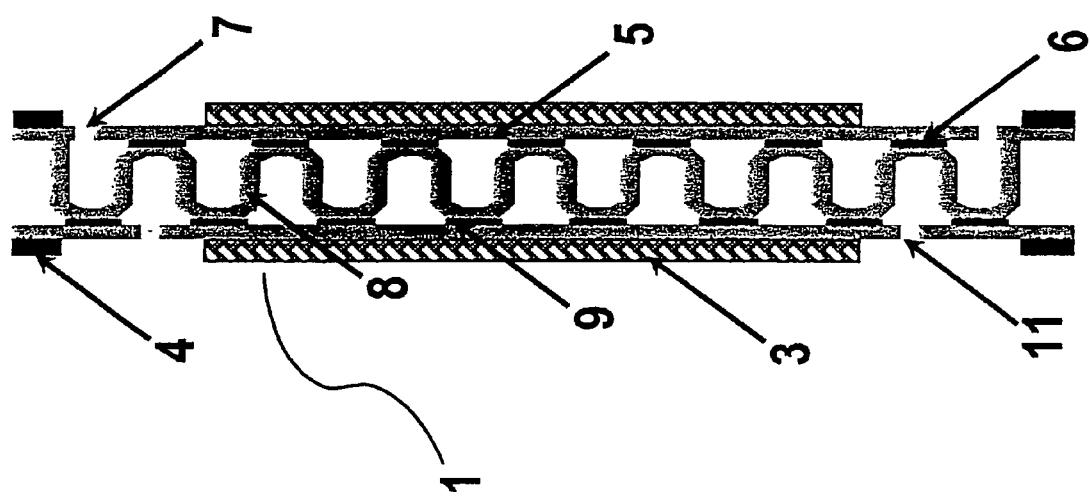
Fig. 3

BIPOLAR SEPARATOR FOR FUEL CELL STACK

This application is a 371 of PCT/EP2004/010930 filed Sep. 30, 2004.

DESCRIPTION OF THE INVENTION

The present invention relates to a bipolar separation element between fuel cells, in particular polymer membrane fuel cells, laminated in a stack in a filter press configuration.

As is known in the art, fuel cells are electrochemical generators converting the chemical energy of the reaction between a fuel and an oxidant to electrical energy, producing water as a by-product. Among the various known types of fuel cells, the polymer membrane type is the one which operates at the lowest temperature, typically 70-100° C., providing sensible advantages in terms of easiness and safety of operation, of material stability and especially of quickness in start-up and in reaching the final regime operating conditions. Among the main problems which have slowed the industrial diffusion of this technology, one of the most significant lies in the fact the energy produced by a single cell is obtained as direct current of relatively high intensity versus a very limited voltage (in any case lower than 1 V, and typically comprised between 0.5 and 0.8 V). This characteristic, whose reasons are of thermodynamic nature and thus intrinsic to the process, makes necessary the lamination of a certain number of cells in stacks assembled in accordance to a filter-press type arrangement. The stacks proposed for an industrial utilisation consist therefore of some tens of elements, not seldom exceeding one hundred single cells; this entails, besides the apparent problems associated with the constructive tolerances and with the tightening of the final module, also assembling times heavily affecting the final cost, each cell consisting of a multiplicity of pieces, including bipolar plates, gaskets, current collectors and electrochemical components such as electrodes and membranes.

The constructive complexity of polymer membrane fuel cells is imposed by the multiplicity of functions required to make the reactions of fuel oxidation and oxidant reduction proceed with a high efficiency. Besides the optimum functioning of the electrodes which are the sites of the two reactions, and which must be provided with adequate catalysts, generally based on noble metals, a critical factor is given by the ion-exchange membrane acting as the solid electrolyte and which must provide for transporting the electrical current as a flow of ions; in particular, the protons generated by the oxidation of the fuel, that in the most common of cases consists of hydrogen, either pure or in admixture, have to cross the membrane thickness and be transported to the cathode side where they are consumed by the reaction with the oxidant, generally consisting of oxygen, also pure or in admixture. The ion-exchange membranes currently available on the market consist of a polymeric backbone, often perfluorinated for the sake of chemical stability, whereto anionic functional groups are attached, capable of bonding protons albeit to a sufficiently weak extent to allow the migration thereof under the effect of the electric field generated by the reactants. In order for this mechanism to be effective, in other words in order for the membrane ionic conductivity to be sufficient, it is necessary to maintain a high degree of hydration of the membrane during operation. For most of the operating conditions of practical interest, the water produced at the cathode by the reaction of oxygen with the protons coming from the anode side is not sufficient to guarantee that such hydration conditions are always maintained; the flow of gaseous reactants supplied to the cells tends in fact to favour a consistent evaporation, which must be somehow counterbalanced. Maintaining an adequate water balance furthermore implies an accurate thermal control of the cell, which constitutes another problem of no trivial solution. In conditions of electric power generation of practical use, the system irreversibilities generate in fact a much relevant amount of heat, which has to be effectively withdrawn from the cells.

For the above stated reasons, polymer membrane fuel cells must be provided with adequate devices for the humidification of the gaseous reactants and for the withdrawal of the generated heat. This is evidently in contradiction with the demand, prescribed by the market, for the availability of more and more compact systems characterised by a quick and easy assembling.

Whereas the first membrane electrochemical generators of the prior art were constructed with components of ribbed graphite subjected to further cumbersome machining, the most recent technological solutions provide the use of metallic materials with reduced thickness and more favourable mechanical characteristics. They are for instance configured as described in U.S. Pat. No. 5,578,388, providing the supply of previously humidified reactants to the two compartments, anodic and cathodic, of a stack of cells delimited by preferably metallic bipolar plates, coupled to frame-shaped planar gaskets suitable for housing an adequate current collector also acting as distributing chamber, besides ensuring the electrical continuity between the plate itself and the so-called electrochemical package; the latter consists of an ion-exchange membrane-gas diffusion electrode assembly. The current collector is a metallic reticulated element, which favours the delocalisation of the electrical contact and the distribution of the correspondent gas flow along the whole surface of the membrane-electrode assembly. The heat withdrawal is typically achieved through the circulation of water or other thermostatting fluid inside a serpentine embedded within the thickness of the metallic plate; this nevertheless entails the use of rather thick and heavy plates, expensive to manufacture since they are obtained by a delicate moulding operation. As an alternative, stack configurations alternating, within the same lamination, fuel cells to thermostatting cells crossed by water or other cooling fluid capable of exchanging heat through the walls of the metallic plates delimiting the various cells have been proposed. In this way, much thinner plates may be employed and moderate weight reductions of the structures can be obtained, especially important for mobile applications, for instance for fuel cells destined to electrical vehicle transportation. On the other hand, this solution does not offer a substantial improvement in terms of size, since the thickness reduction of the plates is obviously compensated by the addition of the thermostatting cells to the filter-press structure.

Several cell designs have thus been proposed directed to decrease the weight and compact the fuel cell stacks integrating the different functions in the best way and minimising the unemployed volumes: for instance the co-pending international application PCT/EP 03/01207 provides exploiting the peripheral part of the thermostatting cells for distributing the gaseous reactants to the fuel cells, by means of a series of openings obtained on the separating plate outside the zone of circulation of the cooling fluid.

For water-cooled cells, a still more advanced design, described in the co-pending international application PCT/EP03/06327, provides an exchange of matter, through appropriate calibrated holes, also inside the cooling region; in other words, part of the cooling water is allowed to penetrate inside the fuel cells, performing the gas humidification in situ while carrying out an even more effective cooling because of a partial evaporation within the fuel cells. Besides enhancing the heat withdrawal efficiency, this remarkably simplifies the overall system, allowing the elimination of the external humidification units; nevertheless, the two latter disclosed embodiments are rather complex under the standpoint of hydraulic sealing. One of the main problems in the manufacturing of filter-press structures with many laminated elements consists in fact of the coupling of a high number of elastic gaskets, which must be compressed in a uniform fashion once subjected to the tightening load, in order not to jeopardise the alignment of the rigid components (and indirectly the electrical contact), while ensuring the sealing of the different fluids, among which some are particularly critical such as hydrogen. Notwithstanding the consistent improvements in the gasket design and materials, it is very important to minimise their number in order to increase the reliability of the relevant systems. The findings disclosed in the international applications PCT/EP 03/01207 and PCT/EP03/06327 conversely present the evident drawback of a consistent amount of gas-liquid and gas-gas seals, for instance twice the amount of the invention of U.S. Pat. No. 5,578,388. Another disadvantage intrinsic to this types of design, and in general to any design providing the alternation of fuel cells and thermostatting cells, is given by the complexity of the assembly, which provides laminating a remarkable number of components, which must be accurately disposed and perfectly centred, in a fixed sequence.

It is an object of the present invention to provide a fuel cell stack design overcoming the limitations of the prior art.

It is a second object of the present invention to provide a fuel cell stack design of high efficiency comprising a minimal amount of laminated components and of relative hydraulic seals for a given amount of installed cells.

It is a further object of the present invention to provide an integrated separator for fuel cells simultaneously achieving the internal circulation of a cooling fluid, the distribution of the gaseous reactants to the cells and optionally the humidification of the latter or of just one of them.

Under a first aspect, the invention consists of a bipolar separator delimited by a cathode sheet and an anode sheet, at least one of which provided with fluid passage holes, wherein said sheets are welded or metallurgically bonded through a conductive corrugated element so as to delimit a cooling fluid passage section.

Under a second aspect, the invention consists of a stack of fuel cells disposed in a filter-press arrangement and separated by an integrated conductive element performing, in the different embodiments, one or more functions among which the thermal regulation of the cell, the distribution and the humidification of the reactants without resorting to additional thermostatting cells.

The separator of the invention is delimited by two conductive sheets, at least one of which is provided with fluid passage holes, respectively suitable for acting as cathode and anode sheet in a filter-press type bipolar arrangement. The two conductive sheets are mutually welded or otherwise secured through an interposed conductive element, whose geometry is of the corrugated type in order to determine, in a preferred embodiment, the formation of channels for the passage of a thermostatting fluid, preferably water in the liquid state. By corrugated element in this context it is intended a generic element, for instance obtained from a planar sheet, with an undulated or otherwise shaped profile so as to form projections and depressions; said projections and depressions are welded or otherwise secured alternatively to one or the other sheet delimiting the separator. The corrugated element has the dual purpose of mechanically adjoining the anode and cathode sheets and of ensuring the electrical continuity between the same. The corrugated element may be present just on a peripheral part of the separator, for instance in correspondence of two opposed sides, or it may be disposed along the whole surface of the sheets. In the latter case, the corrugated conductive element advantageously delimits channels which can be used for the circulation of a cooling fluid, preferably liquid water. In case the corrugated element is present just in a peripheral region of the separator, usually outside the cell's active area, the internal part may be advantageously filled with a reticulated material suitable for being employed for the circulation of a cooling fluid. As the reticulated material, metallic foams or meshes, expanded sheets, sintered porous materials may be advantageously used, also in mutual combination or juxtaposition; however, other types of reticulated materials may be employed without departing from the scope of the invention.

As said above, one or both of the sheets delimiting the separator are provided with fluid passage holes; by fluid passage hole in this context it is intended a through opening of any shape or profile, obtained on the main surface of the corresponding sheet, suitable for being crossed by a liquid or a gas. In a particularly preferred embodiment, both of the sheets are provided with holes, preferably disposed along a peripheral region, in communication with a gas feeding duct; such holes can thus be employed to supply a gaseous reactant to the adjacent fuel cell, in a similar way as disclosed in PCT/EP 03/01207. Equivalent holes, in communication with a discharge duct, are preferably used for discharging exhaust reactants and reaction products.

In a preferred embodiment, fluid passage holes, preferably in the form of calibrated orifices, are present in the internal part of the main surface of the separator, in correspondence of the cooling fluid passage section. This embodiment is particularly advantageous, especially in case the cooling fluid is liquid water, since the controlled passage of a portion of said cooling water from the inside of the separator to the outside, toward one or both the adjacent fuel cells, determines the humidification of one or both reactants, moreover contributing to the heat withdrawal by evaporation, in a similar manner as described in PCT/EP03/06327. The present invention thus exhibits the same advantageous features of the findings of PCT/EP 03/01207 and PCT/EP03/06327, making use however of an integrated separator directly interposed between the fuel cells, which replaces the thermostatting cells and the relative components to be individually assembled, simplifying the hydraulic sealing system by eliminating the relative gaskets and facilitating the assembly procedure to a radical extent.

For the sake of further favouring a quick assembly, and an error-proof one in the component alignment, the separator of the invention may be also provided externally with current collectors and/or gaskets, welded or otherwise secured on one or preferably both of the cathode and anode sheets. In such a way, the assembly of a stack would be accomplished with the minimum possible number of pieces, in the most extreme of cases with just the separator provided with integrated collector and gasket besides the electrochemical package consisting of an activated membrane or a membrane-electrode assembly as known in the art. Some of the preferred embodiments will be now disclosed making reference to the attached figures, which have a merely exemplifying purpose and do not wish to constitute a limitation of the invention.

FIG. 2 shows two embodiments of the separator of the invention.

FIG. 3 shows two other embodiments of the separator of the invention, comprising integrated gaskets and current collectors.

Figure 1:
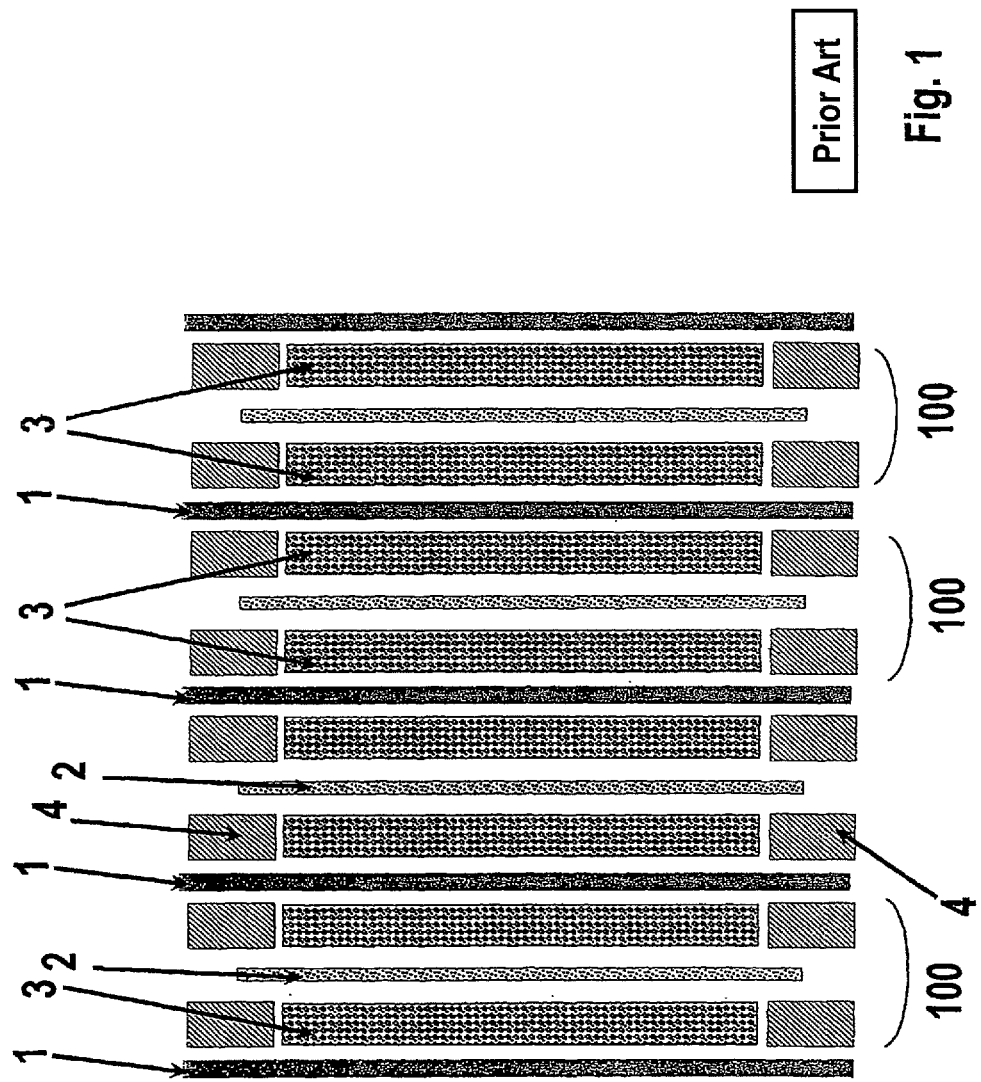
FIG. 1 shows a fuel cell stack according to the prior art.

The fuel cell stack of FIG. 1 is configured in accordance with the most widespread teaching of the prior art, and comprises a juxtaposition of laminated single fuel cells (100), delimited by separators (1) in form of bipolar sheets, which enclose an electrochemical package (2) consisting of an ion-exchange membrane activated on the two faces with a catalyst or by an ion-exchange membrane/gas diffusion electrode assembly, as known in the art. The electrochemical package (2) divides the cell into two compartments, cathodic and anodic. The electrical continuity between the separators (1) and the electrochemical package (2) is ensured by the interposition of an appropriate current collector (3), which in the illustrated case is for instance a reticulated conductive material also acting as a gas distributor. The hydraulic sealing of the cells is ensured by suitable gaskets (4), usually plane gaskets. Each of the cells (100) is fed with a gaseous reactant, fuel and oxidant, in the respective anodic and cathodic compartments, by means of suitable ducts not shown in the figure, as known in the art of filter-press type module design. The discharge of the exhausts and of the reaction products is likewise carried out by means of a collecting duct. A design of this kind does not provide the integrated humidification of the reactants, which must be carried out externally, while the cell thermal regulation is typically carried out with serpentines, also not shown, embedded in the sheets acting as separators (1). Alternatively, thermostatting cells could have been intercalated to the fuel cells (100), delimited by the same separators (1) and internally crossed by a liquid coolant; in this case, the assembly and the hydraulic sealing would have obviously been complicated by the addition of the specified components.

FIG. 2 shows two possible embodiments of the separator (1) of the invention; in both cases, the separator is delimited by sheets (5), one cathodic and one anodic, joined by means of a corrugated element (8) secured by weld spots (6, 9) or other forms of metallurgical bonding; in the case illustrated on the left hand side of the figure, the corrugated element (8) joins the cathode and anode sheets (5) along the whole surface delimiting a serpentine channel which may be advantageously crossed by a cooling fluid supplied from an appropriately connected circuit, not shown. In the case illustrated on the right hand side of the figure, the corrugated element is present only on a peripheral part of the separator (1), typically outside the cell's active area, while within the recess delimited by the two sheets (5) in the internal part, a reticulated element (10) is present, which can be crossed by a cooling fluid supplied from an appropriately connected circuit, not shown. In both of the illustrated embodiments, the separator is therefore capable of providing for the thermal regulation of the adjacent fuel cells. Furthermore, in both variants are present, in correspondence of a peripheral region of the separator (1), suitable holes (7) which can be employed for feeding gaseous reactants coming from gas feed ducts, not shown, in communication with said peripheral region, to the respective adjacent fuel cells. Likewise, the relevant holes (11) for the discharge of the exhausts and of the reaction products toward external discharge ducts, not shown, are present. In this way, the separator (1) of the invention performs the function of gas distributor to the cells, allowing to obtain a compact design taking advantage of what would otherwise be a dead zone. The constitutive elements of the separators (1) in FIG. 1 are evidently not reported in scale; the feed (7) and discharge holes (11), for example, are usually tiny, and have been magnified in the figure with respect to the typical situation in order to explain their function with better clarity.

In the version illustrated at the right hand side, the communication holes between the inside and the outside of the separator (1) also comprise calibrated orifices (7') which serve to allow a controlled passage of cooling water toward the adjacent fuel cells: in this case, the separator (1) performs also the function of humidifying the reactants of the adjacent cells; the heat withdrawal from said cells is moreover incremented by the evaporation of part of the water passing through the orifices (7') inside the same cells.

The different characteristics of the separators in FIG. 2 have been combined in a casual fashion, and what illustrated does not constitute a limitation of the invention; for instance, the calibrated orifices (7') for feeding water could have been coupled to a corrugated element (8) present along the whole surface as in the case of the drawing on the left, and so on.

FIG. 3 shows two embodiments equivalent to those of FIG. 2, further comprising the integration of the current collectors (3) and of the gaskets (4) of the fuel cells (100). In this way, the amount of components to be laminated for the realisation of the filter-press configuration is reduced to a minimum. The current collectors (3) may be integrated to the separator (1) of the invention by welding, also of the spot type, by soldering or other metallurgical bonding; the gaskets (4) may be integrated by moulding, gluing or by other systems known to those skilled in the art. Variations of the illustrated embodiments are evidently possible, without departing from the scope of the invention; for instance, the integrated bipolar separator (1) may comprise the current collectors (3) and not the gaskets (4) or vice versa, or again it may comprise one or both of those elements on both sides or on one side only.

As is apparent for one skilled in the art, the invention may be practised making other variations or modifications to the cited examples.

It must be intended therefore that the foregoing description does not wish to limit the invention, which may be employed according to different embodiments without departing from the scopes thereof, and whose extent is univocally defined by the appended claims.

In the description and in the claims of the present application, the term "comprise" and its variations such as "comprising" and "comprises" are not intended to exclude the presence of other elements or additional components.

The invention claimed is:

1. A bipolar separator for a fuel cell stack, comprising:
   a cathode sheet and an anode sheet, at least one of said sheets provided with fluid passage holes;
   at least one corrugated conductive element,
   wherein said cathode sheet and said anode sheet are welded or metallurgically bonded through said at least one corrugated conductive element; wherein a cooling fluid passage is formed between the corrugated conductive element and at least one of said cathode sheet and anode sheet; and wherein said at least one corrugated conductive element adjoins said cathode and anode sheets only in one or more peripheral regions of the separator.

2. The separator of claim 1, wherein said fluid passage holes are gas feed and/or discharge holes disposed in one or more peripheral regions of said at least one sheet.

3. The separator of claim 1 wherein said fluid passage holes comprise calibrated orifices for feeding a flow of said cooling fluid into a fuel cell adjacent to the separator.

4. The separator of claim 1 wherein a cooling fluid passage section comprises at least one reticulated element interposed between said cathode sheet and said anode sheet.

5. The separator of claim 4 wherein said at least one reticulated element is an electrically conductive, optionally metallic element.

6. The separator of claim 5 wherein said at least one conductive reticulated element is selected from the group consisting of metal foams, metal meshes, expanded sheets and sintered metallic materials.

7. The separator of claim 1 wherein at least one of said anode and cathode sheets comprises a sealing gasket secured to the side opposite to the one whereto said corrugated conductive element is welded or metallurgically bonded.

8. The separator of claim 1 wherein at least one of said anode and cathode sheets comprises a current collector welded or metallurgically bonded to the side opposite to the one whereto said corrugated conductive element is welded or metallurgically bonded.

9. The separator of claim 8 wherein said current collector is an electrically conductive reticulated element optionally selected from the group consisting of metal foams, metal meshes, expanded sheets and sintered metallic materials.

10. A fuel cell stack comprising at least one separator of claim 1.

11. The stack of claim 10 comprising at least one feed or discharge duct in communication with said fluid passage holes.

12. The separator of claim 1, wherein the fluid passage holes in said anode and/or said cathode sheet are gas feed and/or discharge holes located only in one or more peripheral regions.

13. The separator of claim 1, further comprising a reticulated element interposed between said anode sheet and said cathode sheet, forming a cooling fluid passage section between said anode sheet and cathode sheet, wherein at least one of said anode sheet and said cathode sheet has fluid passage holes in a region in contact with the reticulated element.

* * * * *